(12) United States Patent
Monta

(10) Patent No.: US 7,068,730 B2
(45) Date of Patent: Jun. 27, 2006

(54) WIDEBAND MULTI-CHANNEL QUADRATURE AMPLITUDE MODULATION OF CABLE TELEVISION SIGNALS

(75) Inventor: Peter Monta, Palo Alto, CA (US)

(73) Assignee: RGB Networks, Inc., San Mateo, CA (US)

( * ) Notice: Subject to any disclaimer, the term of this patent is extended or adjusted under 35 U.S.C. 154(b) by 0 days.

(21) Appl. No.: 11/124,560

(22) Filed: May 6, 2005

(65) Prior Publication Data

US 2005/0238116 A1   Oct. 27, 2005

Related U.S. Application Data

(63) Continuation of application No. PCT/US04/012488, filed on Apr. 21, 2004.

(60) Provisional application No. 60/464,447, filed on Apr. 21, 2003.

(51) Int. Cl.
*H04L 27/36* (2006.01)

(52) U.S. Cl. ............... 375/298; 375/261; 375/296; 375/354; 370/206; 332/103

(58) Field of Classification Search ............. 375/298, 375/26, 261, 295, 354, 296; 370/206; 332/103
See application file for complete search history.

(56) References Cited

U.S. PATENT DOCUMENTS

| | | | |
|---|---|---|---|
| 5,732,068 A * | 3/1998 | Takahashi et al. | 370/206 |
| 5,825,829 A | 10/1998 | Borazjani | |
| 6,317,409 B1 | 11/2001 | Murakami | 370/203 |
| 6,430,228 B1 | 8/2002 | Zhang | |
| 6,546,055 B1 | 4/2003 | Schmidl et al. | |
| 6,590,871 B1 | 7/2003 | Adachi | 370/307 |
| 6,678,318 B1 | 1/2004 | Lai | |
| 6,928,120 B1 * | 8/2005 | Zhang | 375/260 |
| 6,954,505 B1 * | 10/2005 | Gatherer et al. | 375/260 |
| 2001/0009574 A1 * | 7/2001 | Iemura | 375/322 |
| 2002/0080887 A1 * | 6/2002 | Jeong et al. | 375/295 |
| 2003/0118134 A1 | 6/2003 | Harris | 375/350 |
| 2004/0081205 A1 * | 4/2004 | Coulson | 370/503 |
| 2004/0258174 A1 | 12/2004 | Shao et al. | 375/267 |
| 2005/0169395 A1 * | 8/2005 | Monta | 375/261 |

FOREIGN PATENT DOCUMENTS

| | | |
|---|---|---|
| WO | WO 2004/079978 A2 | 9/2004 |
| WO | WO 2004/079978 A3 | 9/2004 |
| WO | WO 2004/095793 | 11/2004 |

* cited by examiner

*Primary Examiner*—Chieh M. Fan
*Assistant Examiner*—Ted M. Wang
(74) *Attorney, Agent, or Firm*—Lipsitz & McAllister, LLC

(57) ABSTRACT

Wideband, direct-to-RF multi channel QAM modulation is described whereby IFFT processing is employed to modulate a plurality of encoded symbol streams in parallel onto a like plurality of uniformly spaced carriers. A high-frequency master clock and high-performance, high-frequency D/A converters are employed. The IFFT modulation process yields a multi-channel multiplex at an intermediate "baseband" frequency. The multi-channel multiplex is then synchronously converted to analog form and synchronously frequency shifted upward by one-half the master clock frequency using a quadrature doubly-balanced mixing scheme. The resultant multi-channel encoded multiplex occupies a frequency band centered around one half the master clock frequency. Multi-rate techniques can be employed to yield high-speed digital processing from digital logic incapable of operating directly at the master clock frequency.

20 Claims, 6 Drawing Sheets

WIDEBAND MULTI-CHANNEL QUADRATURE AMPLITUDE MODULATION OF CABLE TELEVISION SIGNALS

CROSS-REFERENCE TO RELATED APPLICATIONS

This application claims the benefit of U.S. Provisional Patent Application No. 60/464,447 filed on Apr. 21, 2003, which is incorporated herein by reference.

This application is a continuation of copending PCT/US Patent Application No. PCT/2004/012488 filed on Apr. 21, 2004, which is incorporated herein by reference.

This application further relates to PCT/US 2004/006064 filed on Mar. 1, 2004, which is incorporated herein by reference.

TECHNICAL FIELD OF THE INVENTION

The present invention relates to digital data transmission systems, more particularly to multi-channel distribution of digitally-encoded data streams over a cable, optical fiber or similar transmission medium, and still more particularly to multi-channel QAM modulation of digital television data and related data sources.

BACKGROUND

Over the last several years, there has been considerable growth in the availability of digital cable and satellite television broadcasting. As demand for digital programming continues to grow, cable television providers are transitioning from analog cable transmission systems and converters to mixed analog/digital and all-digital cable distribution systems. Increasing competition from digital satellite service providers has contributed to increased demand for more and different digital cable services including digital data services, interactive programming services and "on-demand" services like video-on-demand (VOD). A high-end variant of VOD, "everything-on-demand" (EOD), offers a dedicated, full-time video and audio stream for every user. An EOD stream can be used to view time-shifted TV, movies, or other content stored by content providers at the head end of the network, with full VCR-like controls such as pause, fast forward, random access with "bookmarks", etc.

In combination with other services like interactive programming, cable Internet services, etc., these per-user services require considerably more infrastructure than do pure broadcast services. These newer, high-end services require a server subsystem to provide dynamically customized multi-program multiplexes on a per-user basis. Clearly, this requires a great deal of high-speed, high-performance processing, data routing, encoding and multiplexing hardware that would not otherwise be required.

As demand continues to grow for these high-end, per-user services, there is a growing need for more efficient, more cost-effective methods of creating large numbers of custom program multiplexes.

SUMMARY OF THE INVENTION

The present inventive technique provides a highly-efficient, cost-effective technique for multi-channel QAM modulation by employing an inverse fast-Fourier transform (IFFT) as a multi-channel modulator. QAM encoding expresses data symbols as constellation points in the complex plane such that each QAM symbol represents a specific phase and amplitude of a carrier frequency to which it is applied. In multi-channel systems, the carrier frequencies are generally uniformly spaced at a channel-spacing frequency (6 MHz, for digital cable systems in the United States). The IFFT, acting as a synthesis uniform filterbank, accepts a set of frequency domain inputs, each representing a 6 MHz sub-band. The inputs are all uniformly spaced, so assuming that the IFFT is sampled at a rate to provide the appropriate frequency spacing between its frequency-domain inputs, the IFFT will produce a time domain representation of QAM symbols applied to its various inputs modulated onto carriers with the desired channel separation.

Typically, baseband filtering is applied to the QAM input streams to shape the baseband spectrum and, in cooperation with the receiver filtering, control intersymbol interference. Also, anti-imaging filters are applied to the IFFT output to ensure proper channel separation.

According to an aspect of the invention, a typical multi-channel QAM modulator includes QAM encoding means, inverse FFT (IFFT) processing means, D/A conversion and upconversion. The QAM encoding means encode multiple digital input streams into multiple corresponding QAM symbol streams. The IFFT creates the desired modulation and channel spacing of the QAM symbol streams in an intermediate complex baseband, in digital form. The D/A conversion means convert the digital output from the IFFT conversion process into analog form, and the up-conversion means frequency shift the resultant multi-channel IF QAM signal up to a target frequency band to realize a multi-RF output for transmission.

According to an aspect of the invention, the digital data streams can be 256-QAM or 64-QAM encoded according to ITU specification J.83 Annex B.

According to an aspect of the invention, baseband filtering, anti-imaging and interpolation are all combined into a single post-IFFT time-varying digital filter stage.

In combination, then, one embodiment of a multi-channel QAM modulator for modulating a plurality of digital data streams onto a single multi-output is achieved by means of a set of QAM encoders, IFFT processing means, post-IFFT combined filtering means, D/A conversion means and up-converter means. The QAM encoders provide QAM symbol stream encoding of the digital data input streams. As described previously, IFFT processing performs parallel multi-channel QAM modulation in an intermediate frequency band. Post-IFFT combined filtering effectively combines baseband filtering, anti-imaging filtering and rate interpolation into a single filtering stage. The D/A conversion converts IF output from the post-IFFT filtering means from digital to analog form and the up-converter means frequency shifts the resultant analog signal into a target frequency band on a multi-RF output.

According to an aspect of the invention, digital quadrature correction means can be employed in the digital domain to pre-correct/pre-compensate for non-ideal behavior of the analog up-converter means.

According to another aspect of the invention, digital offset correction can be employed in the digital domain to pre-correct for DC offsets in the analog D/A conversion and up-converter means.

The present inventive technique can also be expressed as a method for implementation on a Digital Signal Processor, FPGA, ASIC or other processor.

According to the invention, multi-channel QAM modulation can be accomplished by providing a plurality of digital data input streams, encoding each of the digital data streams into a set of QAM-encoded streams, processing the QAM-encoded streams via an inverse FFT (IFFT) to modulate the plurality of QAM-encoded streams into a single digital multi-channel IF stream encoding the multiple QAM encoded streams onto a set of uniformly spaced carrier frequencies in an intermediate frequency band, converting the digital multi-channel IF stream to analog form; and frequency-shifting the analog multi-channel IF stream to a target frequency band onto a multi-RF output.

According to another aspect of the invention, the digital multi-channel IF stream can be post-IFFT filtered via a combined baseband and anti-imaging filter.

According to another aspect of the invention, the digital multi-channel IF stream can be interpolated to compensate for any difference between the QAM symbol rate and the channel spacing (sample rate).

According to another aspect of the invention, the digital multi-channel IF stream can be digitally quadrature corrected to pre-correct for non-ideal behavior of the frequency shifting process (in particular, the errors in an analog quadrature modulator).

According to another aspect of the invention, digital offset correction can be applied to compensate for DC offsets in the digital-to-analog conversion and frequency-shifting processes.

Another embodiment of the invention provides direct-to-RF modulation without up-converters by employing high-speed digital to analog converters. In this embodiment, a high-speed, low-phase-noise master clock is provided. The IFFT processing described hereinabove is performed such that at a sample rate equivalent to the master clock frequency. The resultant "IF" multi-channel complex digital stream is then synchronously converted to analog and frequency shifted upwards by means of a quadrature doubly-balanced mixer operating on quadrature clocks at one-half the master clock frequency. If, for example, the master clock frequency is 1000 MHz, then the resultant frequency-shifted multi-channel QAM-encoded signal will occupy a frequency band centered around one-half the master clock frequency.

According to an aspect of the invention, the digital processing can be achieved using a multi-rate technique whereby the digital function is replicated several times as a set of digital sections, each section operated at a submultiple of the master clock frequency to produce complex digital outputs at the submultiple rate. Multiplexers are then used to switch between the outputs of the digital sections at the master clock rate to produce complex outputs at the master clock rate.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments.

The structure, operation, and advantages of the present preferred embodiment of the invention will become further apparent upon consideration of the following description taken in conjunction with the accompanying drawings, wherein.

DETAILED DESCRIPTION OF THE INVENTION

The present inventive technique provides an efficient, cost-effective means of multiplexing multiple "channels" of digital television and other data onto a single transmission medium.

Figure 1:
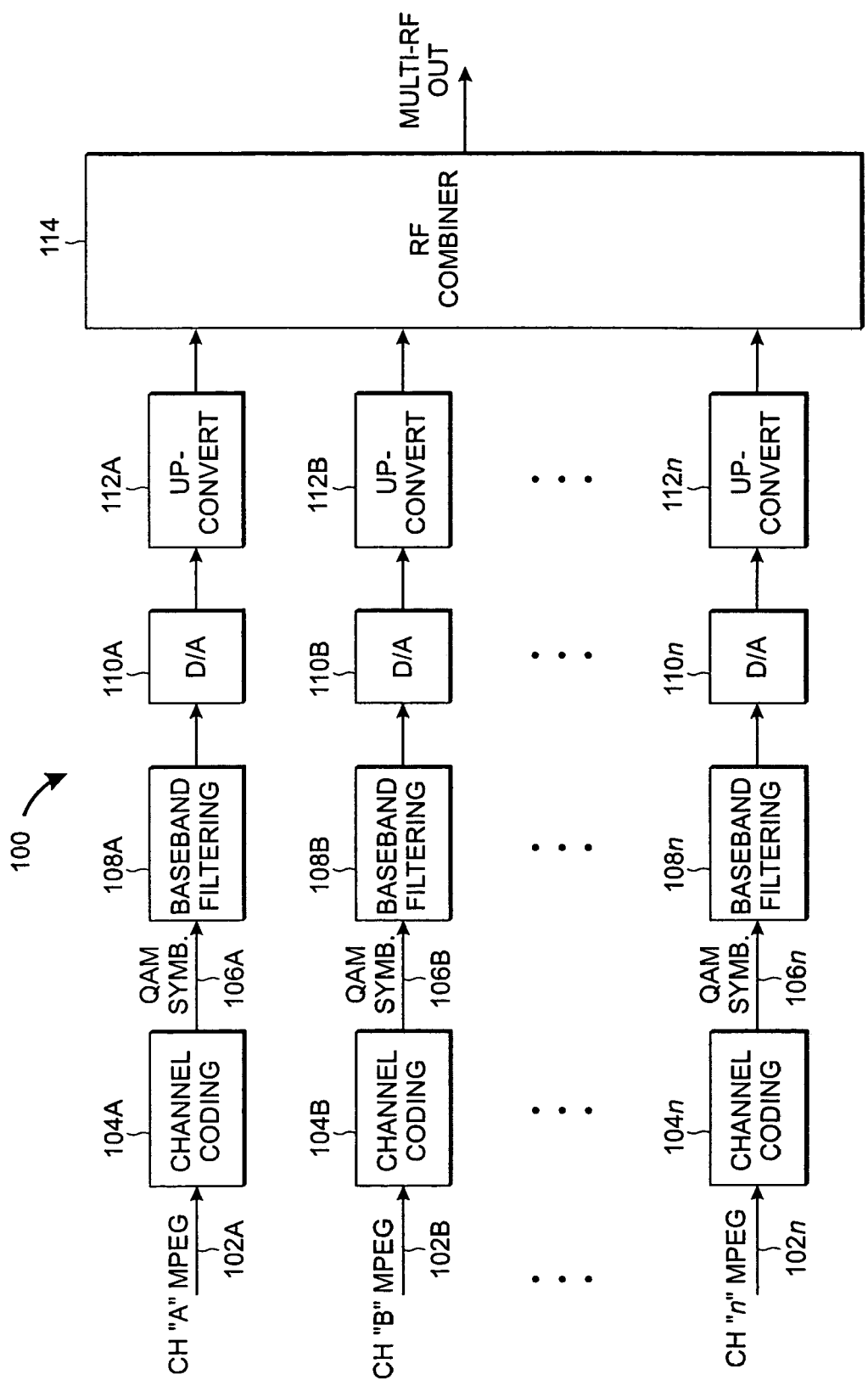
FIG. 1 is a block diagram of a multi-channel Quadrature Amplitude Modulation (QAM) modulator, in accordance with the prior art.

Most prior-art multi-channel QAM modulators are generally organized as shown in FIG. 1, which shows a system 100 of separate channel modulators being combined (summed) via an RF combiner 114 to produce a multi-channel RF output signal (Multi-RF Out). In FIG. 1, MPEG data streams 102A, 102B, . . . , 102n corresponding to "n" separate program sources are each encoded by a respective channel coder 104A, 104B, . . . , 104n to produce a respective QAM "symbol" stream 106A, 106B, . . . , 106n representing the MPEG data streams 102A, 102B, . . . , 102n. Each QAM symbol stream is encoded according to a suitable standard for digital cable television QAM stream encoding (e.g., ITU-T J.83 Annex A or Annex B, provided by the International Telecommunications Union, Geneva, Switzerland) whereby each QAM "symbol" represents one of a set of pre-defined phase/amplitude "constellation points" in complex frequency space. For example, 256-QAM defines a rectangular 16×16 array of constellation points in the complex plane. Each constellation point in the array represents a unique 8-bit binary value encoded at a specific carrier amplitude and phase angle.

According to the United States frequency plan for digital cable television, channels are spaced in 6 MHz intervals, and are encoded at a symbol rate of 5.360537 Mbaud in the case of 256-QAM. Baseband filters 108A, 108B, . . . , 108n each receive a respective encoded 5.360537 Mbaud QAM symbol stream 106A, 106B, . . . , 106n and perform general channel "shaping". (Most European systems operate at 8 MHz channel spacing). Outputs from the baseband filters 108A, 108B, . . . , 108n are then converted by respective digital-to-analog (D/A) converters 110A, 110B, . . . , 110n from digital to analog. Analog outputs from the D/A converters 110A, 110B, . . . 110n are each up-converted by a respective up-converter 112A, 112B, . . . , 112n to a respective channel frequency. Each up-converter 112'x' frequency-shifts an analog QAM-encoded stream from a respective D/A converter 110'x' to a specific channel frequency. Outputs from the up-converters 112A, 112B, . . . 112n are then combined (summed) onto a single multi-RF output by the RF combiner 114 for subsequent transmission over a suitable coaxial cable, fiber or hybrid fiber/coax (HFC) signal distribution network.

Those of ordinary skill in the art will immediately recognize that although inputs to the multi-channel modulator of FIG. 1 are shown as MPEG data streams, any suitable digital information source for which QAM or similar encoding can be defined may be employed. One example is DOCSIS data (Data Over Cable Service Interface Specification) whereby digital communications such as Internet communications can be encoded onto a digital cable television transmission medium. DOCSIS uses the MPEG transport stream as a convergence sublayer.

This multi-channel modulator 100 of FIG. 1 suffers from some inherent inefficiencies. First, the digital-to-analog (D/A) conversion happens too early in the process, and operates only on relatively low-bandwidth baseband streams. As a result, the relatively high sampling-rate capability of most modern D/A converters is wasted. Second, the up-converters each process only a single channel, occupying a tiny 6 MHz slices of the frequency spectrum. This results in poor converter utilization and high cost.

While the availability of a separate up-converter for each 6 MHz channel allows for tremendous frequency agility in that each channel can be placed independently of the others, this agility is not required by present-day applications, and is not envisioned for any future digital cable applications. Blocks of contiguous channels provide adequate flexibility for spectrum planning. (A user's set-top box does not care which RF channel is carrying a program; RF channels can be allocated almost completely arbitrarily among the spectrum channel slots, limited only by operational convenience.)

One approach to improving the cost-effectiveness of the multi-channel modulator of FIG. 1 is to translate as many of its analog components as possible—primarily the up-converters—into their digital equivalents and to move them back "behind" a single D/A converter. This greatly improves D/A converter utilization and eliminates the discrete up-converters. In this approach, numerically-controller oscillators (NCOs) would perform the function of local oscillators (LOs), digital multipliers would perform the function of doubly-balanced mixers, a digital adder would replace the analog RF combiner and digital filters would be employed to interpolate between the baseband channel QAM symbol rate (for example, 5.360537 Mbaud) and a 6 MHz digital conversion rate that facilitates implementation of the required 6 MHz channel spacing. This approach assumes that the addition cost of implementation of the new digital functions will be more than offset by the cost of the eliminated analog functions.

Figure 2:
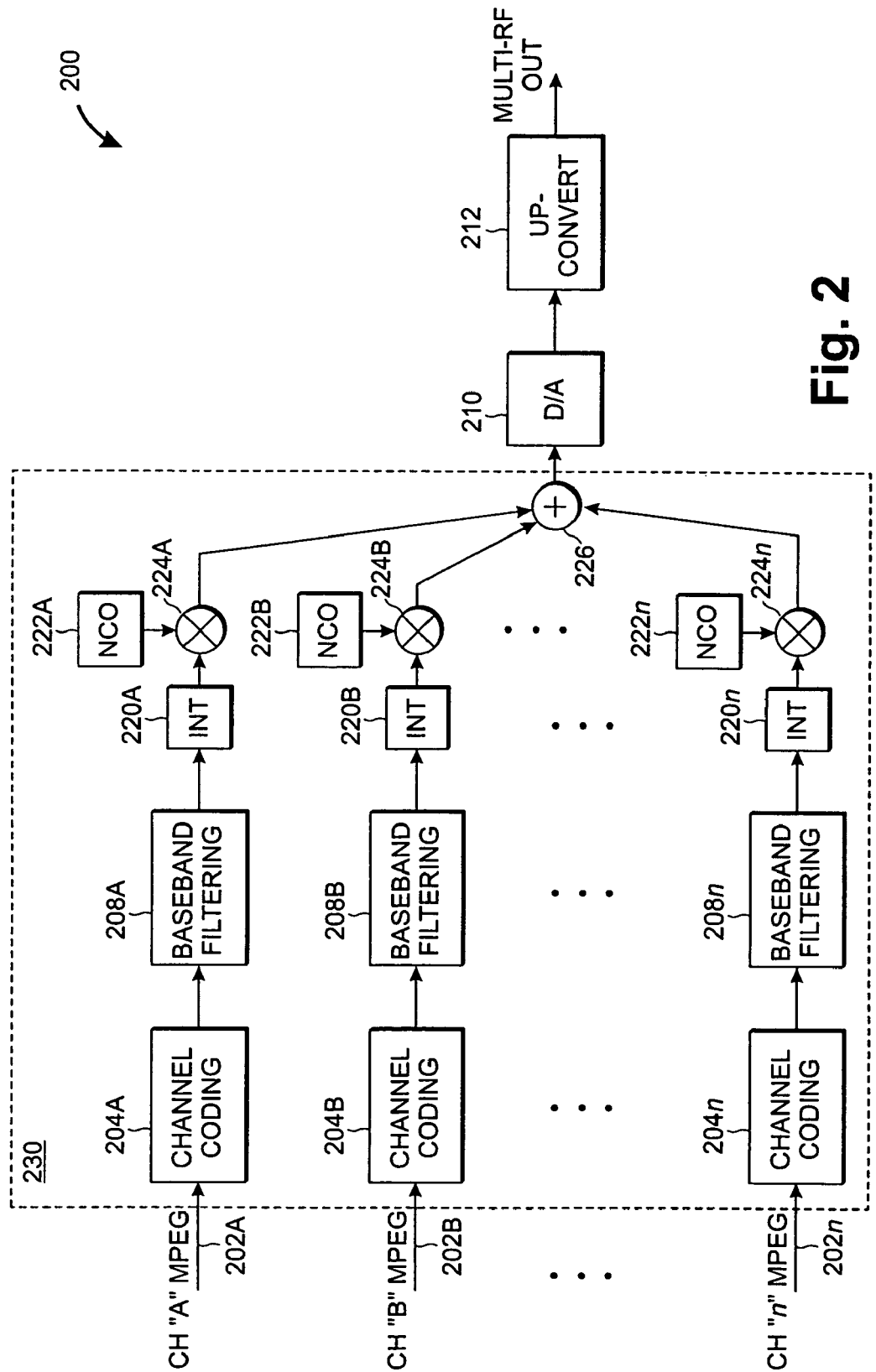
FIG. 2 is a block diagram of a direct translation of the multi-channel QAM modulator of FIG. 1 to digital form.

FIG. 2 is a block diagram of such an implementation. In FIG. 2, a multi-channel QAM modulator 200 comprises a digital processing block 230, followed by a single D/A converter 210 and up-converter 212. In the digital processing block 230, channel coders 204A, 204B, . . . , 204n (compare 104'x', FIG. 1) receive MPEG stream inputs (or other suitable digital stream data) and encode them according to a set of baseband QAM encoding rules (e.g., QAM-256). QAM-encoded data from each channel coder 204A, 204B, . . . , 204n is then processed by a respective digital baseband filter 208A, 208B, . . . , 208n (compare 108'x', FIG. 1). The output of each baseband filter 208A, 208B, . . . , 208n is then processed by a respective digital interpolator 220A, 220B, . . . , 220n that compensates for the difference between the 5.360537 Mbaud QAM symbol rate and the 6n Mhz D/A sample rate, where n is the number of channels. Those of ordinary skill in the art will immediately understand that although the QAM symbol rate and channel spacing would be different under the European frequency plan, the principles remain the same and the same techniques are readily applied.

After interpolation, the output of each interpolator 220A, 220B, . . . , 220n is processed by a respective digital up-converter comprising a respective numerically controlled oscillator (NCO) 222A, 222B, . . . , 222n and a respective digital multiplier 224A, 224B, . . . , 224n. Each NCO 222'x' behaves as a digital equivalent of a local oscillator (LO) and each digital multiplier 224'x' behaves as a digital equivalent of a doubly balanced modulator (DBM or "mixer"). In combination, each NCO/multiplier pair (222'x'/224'x') produces a digital output stream that digitally represents one QAM-coded channel upconverted to a different intermediate frequency. The outputs of the digital multipliers 224A, 224B, . . . , 224n are then summed together in a digital adder 226 to produce a multi-channel digital stream, encoding multiple properly-spaced QAM channels, but in an intermediate frequency (IF) band. This multi-channel digital stream is then converted to analog form by the D/A converter 210. A final up-converter 212 is used to frequency shift the entire analog IF multi-channel stream into the correct frequency band for transmission (Multi-RF out).

Two of the most significant factors in the cost of digital signal processing systems are the cost of the digital signal processors (DSPs) themselves and the cost of D/A converters. Semiconductor densities have exhibited an unabated exponential rate of increase for over 40 years. This trend predicts that any DSP-based or digital logic based technique will benefit over time from the increasing density and decreasing cost associated with digital circuitry. D/A converters are following similar density and cost curves, driven in part by the performance demands and high-volume production of spread-spectrum digital cellular communications and wireless data communications markets.

Digital signal processing techniques can be implemented in a wide variety of technologies, ranging from full-custom dedicated function integrated circuits (ICs) to ASICs (Application-Specific Integrated Circuits) to Field-Programmable Gate Arrays (FPGAs). Hardware description languages (HDLs) such as Verilog and VHDL in combination with logic synthesis techniques facilitate portability of digital designs across these various technology platforms. Each technology has its advantages and disadvantages with respect to development cost, unit pricing and flexibility, and all are capable of performing several hundred million digital operations per second.

Wideband digital-to-analog converters (also "D/A converters", "D/As" or "DACs") have already reached advanced stages of development. For example, the AD9744 from Analog Devices can convert 165 Ms/s with spur-free dynamic range of 65 dB for a cost of $11. This sample rate represents hundreds of video users, so the per-user cost is almost negligible.

The multi-channel modulator approach shown in FIG. 2 can be appropriate for situations where the channels are sparsely distributed over the spectrum, and it can be made fairly efficient by employing multi-rate techniques for the filters, for example CIC filters. The cable-TV spectrum, however, is normally fully populated with uniformly spaced channels. This argues for a more efficient approach.

A significant efficiency improvement can be realized by recognizing that QAM encoding on uniformly spaced channels is simply a representation of a plurality of uniformly spaced, independent complex frequency components. This suggests the use of a transform-based technique to accomplish simultaneous up-conversion of a uniformly-spaced array of complex frequencies to a time-domain representation of a composite, multi-channel multiplex, as has been done for many years in applications such as FDM/TDM transmultiplexers. By way of example, Fast Fourier Transform (FFT) techniques, a special case of the Discrete Fourier Transform (DFT), are well-known, well-defined, computationally efficient techniques for transitioning between time domain and frequency domain representations of signals. The Discrete Fourier Transform, which is in turn a special case of the more general continuous Fourier transform represents a time-varying signal as the linear sum of a set of uniformly spaced complex frequency components. In its inverse form, the inverse DFT (IDFT) transforms a set of uniformly spaced complex frequency components (a frequency "spectrum" array) to its corresponding time-domain representation. The FFT and inverse FFT (IFFT) are computationally optimized versions of the DFT and IDFT, respectively, that take advantage of recursive structure to minimize computation and maximize speed.

If the QAM streams are expressed as a set of time-varying complex frequency coefficient pairs (i.e., A cos $\omega_n$t+jB sin $\omega_n$t, represented as a complex number [A,jB]) and assigned to a specific position in a complex IFFT's input array, and assuming that the IFFT is scaled and sampled such that the frequency spacing of its input array corresponds to the desired channel spacing, then the IFFT will produce a discrete time domain representation of all of the QAM streams modulated onto a set of uniformly spaced carriers and summed together. The IFFT, therefore, in a single computational block, effectively replaces all of the up-converters and local oscillators (NCOs/multipliers) of FIGS. 1 and 2.

Figure 3:
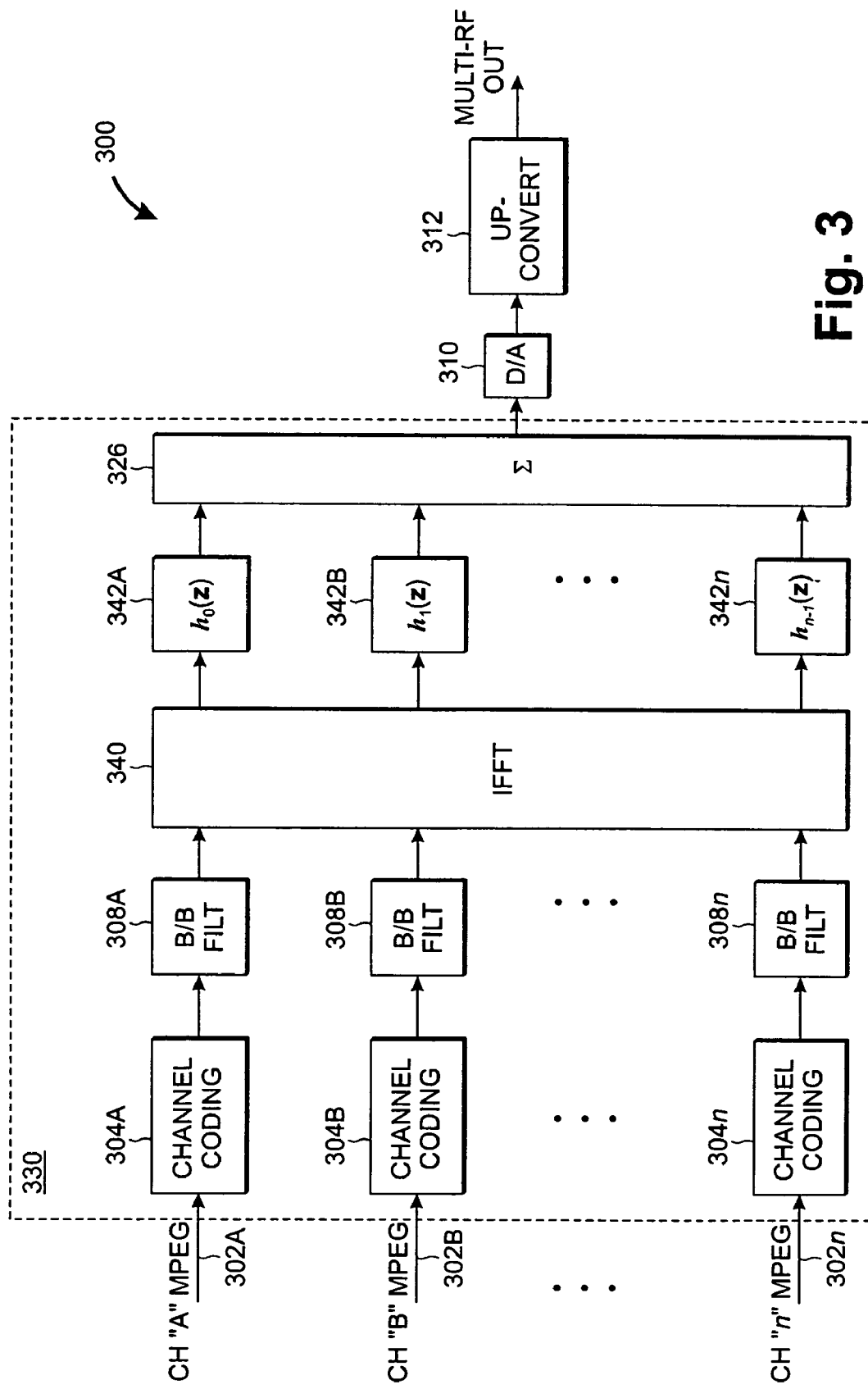
FIG. 3 is a block diagram of an all-digital multi-channel QAM modulator employing an Inverse Fast Fourier Transform, in accordance with the invention.

FIG. 3 is a block diagram of an IFFT-based implementation of a multi-channel QAM modulator 300. In FIG. 3, as in FIGS. 1 and 2, a plurality 'n' of MPEG input streams (or other suitable digital input stream) 302A, 302B, . . . , 302n are QAM encoded by a respective plurality of channel coders 304A, 304B, . . . , 304n and are subsequently processed by a respective plurality of baseband filters 308A, 308B, . . . , 308n to perform per-channel shaping on QAM-encoded complex frequency symbol streams produced by the channel coders 304'x' and producing a set of complex frequency components. The resultant baseband filtered QAM streams are then assigned to a respective complex frequency position in an IFFT input array and processed by an IFFT 340. (A number of transforms are suitable for realizing uniform filterbanks, for example discrete cosine transforms (DCTs), but for simplicity only the IFFT version will be discussed.) The results of the IFFT 340 are processed by a set of anti-imaging filters 342A, 342B, . . . , 342n ($h_0(z)$, $h_1(z)$, . . . , $h_n(z)$) to ensure proper channel isolation, and the outputs of the anti-imagin filters 342'x' are summed together by a digitall adder 326 to produce a composite, multi-channel QAM-encoded digital time-domain stream, which is subsequently converted to analog by a D/A converter 310 and frequency shifted by an up-converter 312 into an appropriate frequency band to produce a multi-RF output.

The design of the modulator 300 of FIG. 3 employs two separate filtering stages: a baseband filtering stage (308'x'—pre-IFFT) and an anti-imaging filter stage (342'x'—post-IFFT). Although this scheme can be employed successfully, the split between the filtering stages is awkward and require considerable attention to the design of the baseband and anti-imaging filters to ensure that their cascaded effect through the IFFT produces the desired results. Further, the use of two separate digital filtering stages is costly in circuitry and/or computations, requiring separate circuitry and/or computations for each stage.

Figure 4:
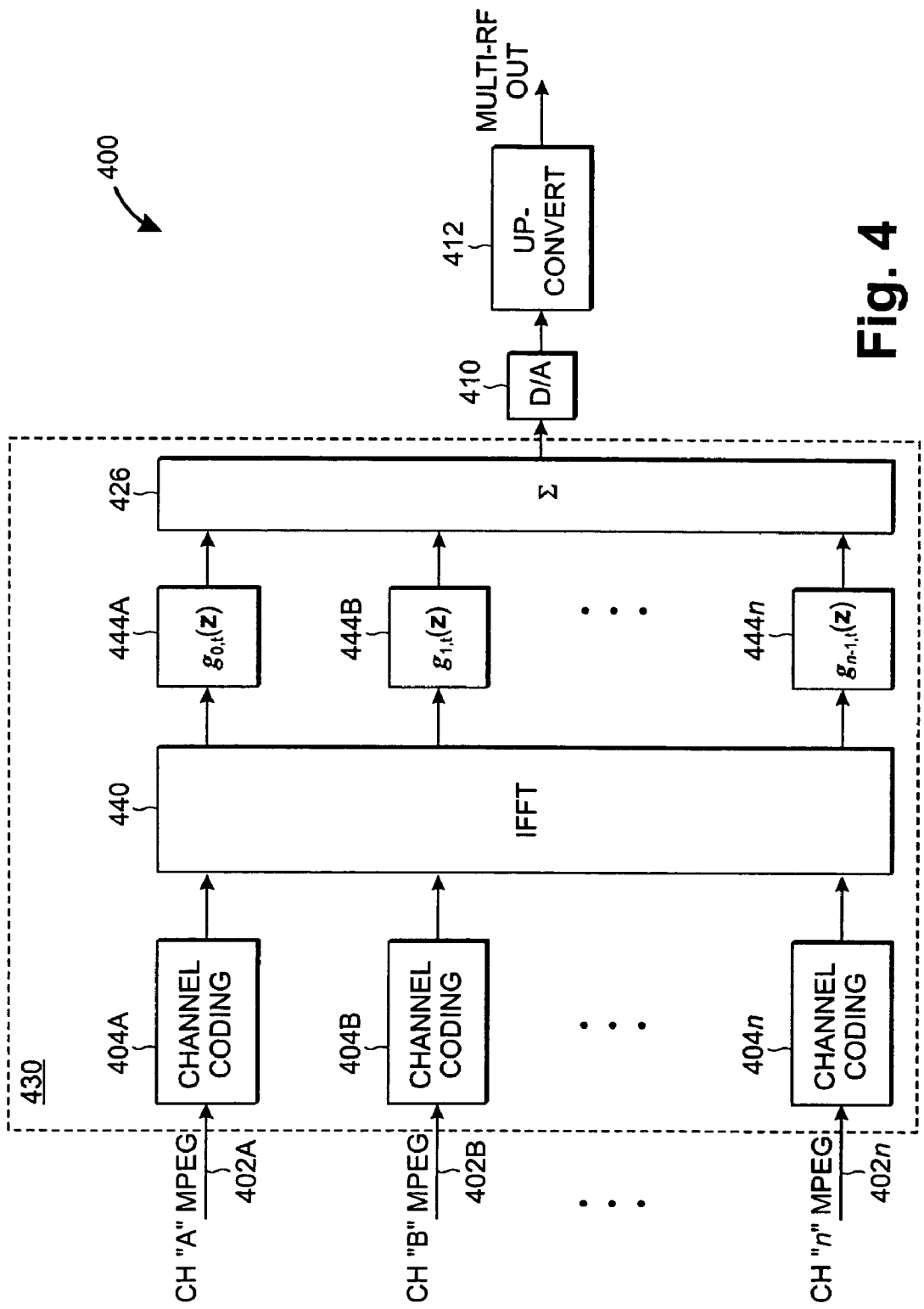
FIG. 4 is a block diagram of a simplified version of the multi-channel QAM modulator of FIG. 3, in accordance with the invention.

This deficiency can be addressed by combining the pre-IFFT baseband filters and post-IFFT anti-imaging filters into a single post-IFFT filter stage. FIG. 4 shows a multi-channel QAM modulator implemented in this way.

FIG. 4 is a block diagram of an IFFT-based multi-channel QAM modulator 400 wherein two-stage baseband filtering and anti-imaging filtering have been combined into single-stage post-IFFT filtering. In FIG. 4, as in FIGS. 1, 2 and 3, a plurality 'n' of channel MPEG (or other digital data) sources 402A, 402B, . . . , 402n are QAM-encoded by a like plurality of respective channel coders 404A, 404B, . . . , 404n. Unlike the implementation described hereinabove with respect to FIG. 3, the QAM-encoded symbol streams are applied directly to the inputs of an IFFT 440, without baseband filtering; therefore the IFFT operates at the QAM symbol rate. Outputs of the IFFT are then processed by a set of post-IFFT combined channel shaping and anti-imaging interpolation filters 444A, 444B, . . . , 444n, producing filtered outputs that are then summed together by a digital adder 426 to produce a composite digital multi-channel QAM-encoded multiplex in an intermediate frequency (IF) band. This multiplex is then converted to analog form via a D/A converter 410, and frequency shifted to an appropriate frequency band by an up-converter 412 to produce a multi-RF output.

The multi-channel modulator 400 of FIG. 4 requires that all input channels (402'x') have the same modulation format and symbol rate, since baseband shaping and anti-imaging are combined in a single filter stage. Further, the IFFT runs at the QAM symbol rate, rather than at the D/A sample rate. These are reasonable restrictions and are easily accommodated in any modern digital television transmission scenario.

Figure 5:
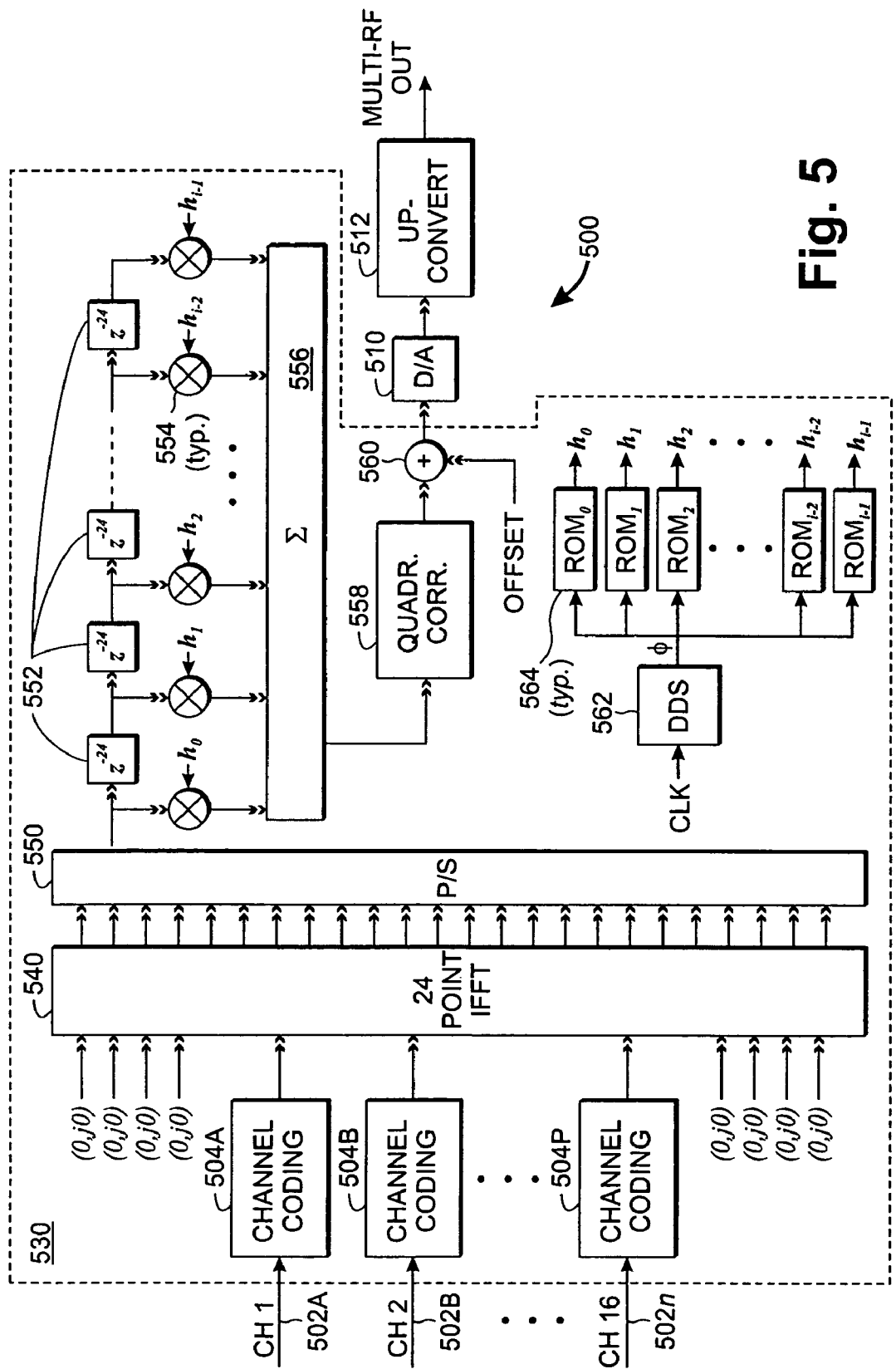
FIG. 5 is a block diagram of a preferred embodiment of a 16-channel QAM modulator, in accordance with the invention.

Attention is now directed to a preferred embodiment of the invention as shown and described hereinbelow with respect to FIG. 5. It should be noted that complex quantities such as complex frequencies or complex time-domain signals (each having two values, a "real" part and an "imaginary" part) are represented in FIG. 5 by double-headed arrows. Real values representing single values are represented in FIG. 5 by single-headed arrows.

FIG. 5 is a block diagram of a 16-channel modulator 500 for multi-channel QAM-256 encoding of 16 MPEG signal streams (or any other suitable QAM-256 encodable digital data source, e.g., DOCSIS data) into a multi-channel RF signal for transmission via cable, optical fiber or HFC transmission medium. Thee converter 500 comprises a digital processing portion 530, a "complex" D/A converter 510 and an up-converter 512 (which, in practice, would consist of two D/A converters, one for real and one for imaginary, and a quadrature modulator).

In FIG. 5, a plurality of 'n' MPEG (or data) streams 502A, 502B, . . . , 502n are QAM-256 encoded according to ITU J.83 annex B to produce a set of complex-frequency QAM symbol representations (indicated by double-headed arrows). A 24 point IFFT function 540 operates at the QAM symbol rate and is employed to convert 24 complex frequency domain inputs to the IFFT 540 into a like number of time-domain outputs. The first four and last four IFFT complex frequency inputs are set to a fixed value of complex "zero" (i.e., (0, j0)). while the complex QAM-encoded streams are applied to the 16 "middle" IFFT inputs. This effectively creates a rectangular "window function" in the complex frequency domain bounding the QAM input streams and facilitates subsequent interpolation.

The 24 outputs of the IFFT function 540 are serialized by a parallel-to-serial (P/S) function 550 that sequentially shifts out successive complex time-domain values (real/imaginary value pairs) from the IFFT. Each IFFT conversion constitutes an IFFT "frame", and the P/S function 550 is organized such that 24 shift-outs occur for each IFFT frame, producing a complex-serial stream output with a frame length of 24.

The complex-serial output from the parallel to serial converter 550 is processed by an "$i^{th}$" order FIR (Finite Impulse Response) digital filter comprising a plurality of i–1 sequentially-connected delay elements 552, "i" complex digital multipliers 554 and a digital adder 556. Each delay element 552 delays the complex serial output of the previous stage by exactly one complete IFFT frame (i.e., 24 complex values). The output from each of the serially connected delay elements 552, therefore, provides a specific delay tap. Each delay tap (and the input to the serially connected array) is multiplied by a real-valued coefficient ($h_x$) via a respective one of the complex digital multipliers 554. Since the coefficients $h_x$ are real-valued, the complex multipliers 554 need not deal with complex cross-products and can simpler than "true" complex multipliers. (Whereas a "true" complex multiplier requires four multiplications and two additions, the simplified complex-times-real multiplier implementation requires only two multiplications and no additions). The complex product outputs from these multipliers are summed together by the digital adder 556 to produce a filter output.

A coefficient generator comprising a direct digital synthesizer 562 (DDS) acting as an address generator for a set of coefficient ROMs 564 cycles through coefficients for the FIR filter in IFFT frame-synchronous fashion, producing a set of "i" coefficient values ($h_0$, $h_1$, $h_2$, . . . , $h_{i-2}$, $h_{i-1}$) in parallel. The DDS 562 updates the coefficient values for each step of the parallel-to-serial converter 550, repeating the sequence of coefficient values every IFFT frame. In combination, these elements produce an interpolating filter that acts as baseband filter, anti-imaging filter and interpolator (for compensating for the difference between the QAM symbol rate and the channel spacing).

The output of the FIR filter is effectively a multi-channel QAM modulated stream with proper channel spacing in an intermediate frequency (IF) band, interpolated and ready for up-conversion. The output is processed first by a quadrature corrector 558 to pre-correct for non-ideal behavior of a final-stage up-converter 512. An offset is added to the output of the quadrature corrector 558 via a digital adder 560 to pre-compensate for subsequent DC offsets. The offset-compensated result is applied to a D/A converter 510 for conversion to analog form. Note that the FIR filter output, quadrature output, and offset-compensated output are all complex quantities. The digital adder 560 is a "double adder" and the offset is a complex quantity. The D/A converter 510 in fact consists of two converters for separately converting the real and imaginary portions of its complex input to analog form. The complex output of the D/A converter 510 is applied to the final-stage up-converter 512 to frequency-shift the fully compensated and corrected IF multi-channel QAM-encoded stream up to a desired final frequency band to produce a multi-RF output for transmission.

A complete Verilog HDL description of the digital portions of the multi-channel modulator is provided as an Appendix to this specification.

Another embodiment of the invention is directed toward a cost-effective wideband modulator for digital cable television. The modulator uses multi-channel filter bank techniques and high-speed digital-to-analog converters to realize, in a single process, a modulator covering the entire cable-television baseband spectrum. Cost per channel is considerably reduced since no up-converters are required (eliminating their associated oscillators, filters, and frequency synthesis chains). Very low phase is achieved through the use of a single fixed-frequency local oscillator (LO) implemented with a SAW oscillator or high-Q resonator.

Present prior-art modulators for digital cable television, whether processing a single 6- or 8-MHz channel or several such channels, invariably require up-converters, usually of the double-conversion super-heterodyne type, to place the signal in its target RF frequency band. These up-converters are expensive, bulky, and since they must be frequency-agile over the entire cable spectrum form about 50 MHz to 850 MHz, they must generally employ at least one wideband voltage-controlled oscillator (VCO). Typically such oscillators are varactor-tuned. Given the performance limits of varactor tuning, such oscillators often exhibit significant phase noise.

Recent progress in the design of high-speed, high-accuracy digital-to-analog converters (DACs), however, suggests a simpler, less costly modulator architecture. For example, Fujitsu's MB-86064 dual DAC is capable of conversion rates of 800 Ms/s (mega-samples per second) at a price of $80. This dual DAC provides AC accuracy consistent with 70 db ACPR (adjacent channel power ratio) for common wideband signals. With such high D/A conversion rates available, it becomes practical to perform all of the frequency translation for a digital-cable modulator digitally.

Figure 6:
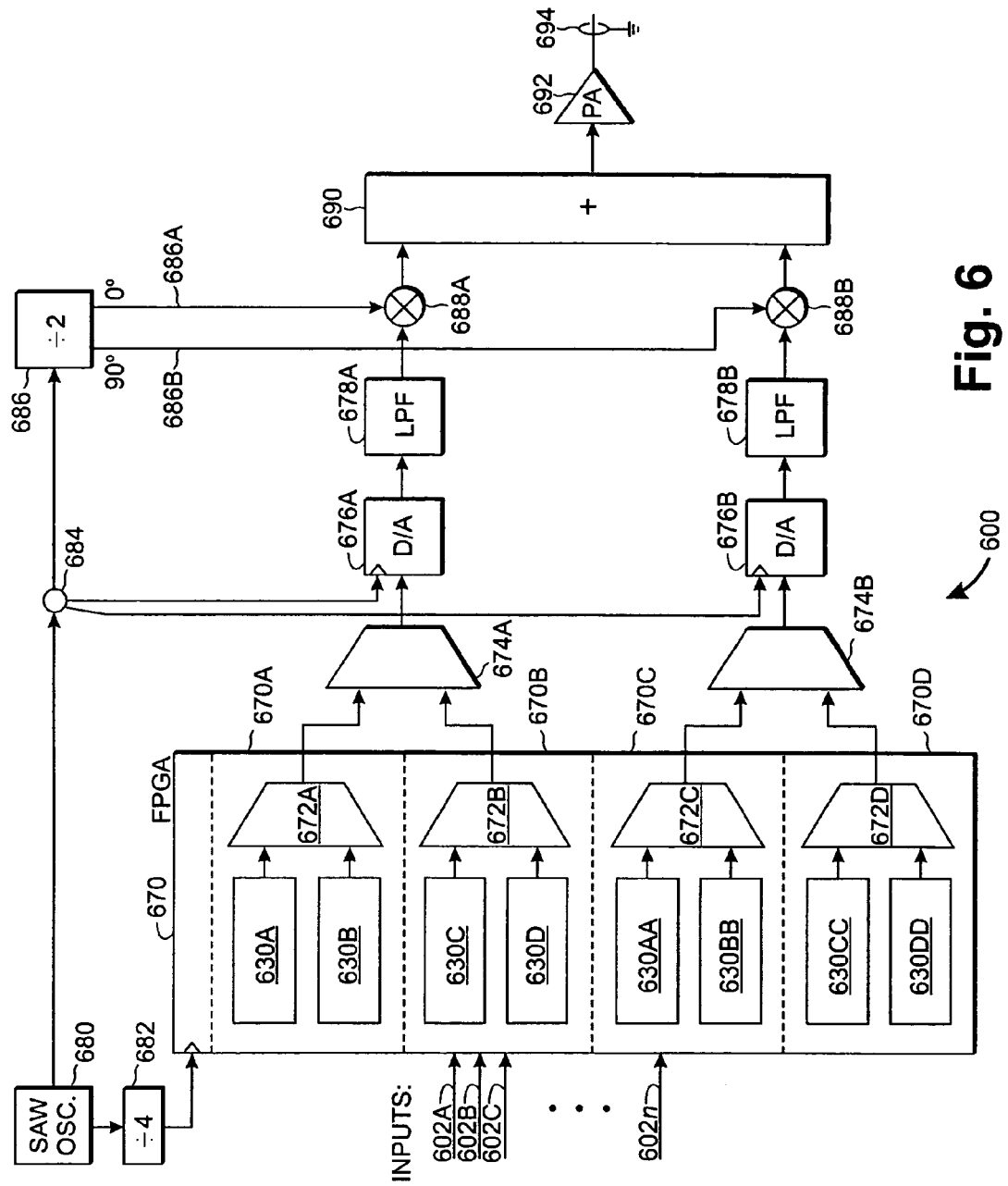
FIG. 6 is a block diagram of another embodiment of a direct-to-RF multi-channel QAM modulator that eliminates the need for up-converters, in accordance with the invention.

FIG. 6 is a block diagram of a direct-to-RF multi-channel QAM modulator 600 that eliminates the need for up-converters by employing high-performance, high-speed 1000 Ms/s DACs 676A and 676B. A single, low-phase-noise oscillator 680 provides a 1000 MHz master clock for the modulator 600. The oscillator 680 is preferably a SAW (surface acoustic wave) oscillator, but can be also implemented with an oscillator based upon a high-Q resonator. Such SAW oscillators (SOs) and voltage-controlled SAW oscillators are commonly used in telecomm applications, such as in SONET (Synchronous Optical NETwork) clock recovery.

A digital signal processing system 670, implemented, for example, in a logic device such as an FPGA (Field-Programmable Gate Array), implements the main digital portion of the direct-to-RF modulator to QAM encode a set of digital stream inputs 602A, 602B, 602C, . . . , 602n and modulate them onto a set of "baseband" carrier frequencies in an intermediate frequency (IF) band. To keep within the performance limits of widely available FPGAs (250 Mhz throughput, for example), the digital function 670 (essentially identical to 530, FIG. 5) is repeated into four parallel execution sections, each one operating at a quarter of the required 1000 MHz modulator effective clock frequency. This requires more circuitry than a single higher-speed section, but lowers the computational performance demands on each section by a factor of four. A digital divider 682 divides the master clock frequency by 4 and provides a 250 MHz quarter-rate clock to the subsections. A clock buffer 684 provides multiple low-skew versions of the master clock to the rest of the circuitry. By operating in parallel, four 250 MHz sections can produce four complex outputs per 250 MHz clock cycle. A multiplexer-based data selection scheme (similar in concept to DDR (DDR) schemes is used to scan through the four sections at the full master clock rate, thereby producing complex outputs at the 1000 MHz master clock rate. In the embodiment shown in FIG. 6, the digital function is divided into eight independent parallel subsections (630A, 630B, 630C, 630D, 630AA, 630BB, 630CC and 630DD), with pairs of sections (630A and 630AA, 630B and 630BB, etc.) operating in tandem at the quarter clock rate (250 MHz) to produce real and imaginary portions of a complex output once per 250 MHz clock cycle. Effectively, the pairs of subsections act in concert as a single "complex" section to produce complex outputs at one quarter the master clock rate. Four first stage 2:1 multiplexers 672A, 672B, 672C and 672D provide a first stage of multiplexing to an effective data rate of 500 MHz, one half the master clock rate. This yields two complex results (four values) per 500 MHz clock cycle. Two additional 2:1 multiplexers 674A and 674B switch between the between the two complex outputs of the first-stage multiplexers at the full 1000 MHz clock rate, providing one complex output per 1000 MHz clock cycle at the outputs thereof.

As shown in the Figure, the first-stage multiplexers 672A, 672B, 672C and 672D are implemented in on-chip DDR multiplexers (commonly provided in the output circuits of high-performance FPGAs). The second stage multiplexers 674A and 674B are provided external to the digital function 670 as standalone, dedicated high-speed multiplexers.

Those of ordinary skill in the art will immediately understand that there are many possible ways of implementing the equivalent digital function 670 described hereinabove. For example, more parallel sections and more tiers of multiplexing could be employed to implement the function in lower-speed logic or fewer sections could be employed with fewer tiers of multiplexing in higher-speed logic. The embodiment shown in FIG. 6 is intended to be representative of one preferred implementation, but should not be considered as limiting. However the digital processing is accomplished, the final complex-baseband signal in the form of in-phase and quadrature data words ("real"/"imaginary" components of the complex outputs) us presented to two high-performance DACs 676A and 676B, (which may both be on a single device, as with the Fujsitsu part mentioned above) for conversion from digital to analog form, yielding two analog outputs.

These analog outputs are processed by low-pass anti-aliasing filters 678A and 678B (which also limit the useful bandwidth to around 650 MHz, or about 108 6-MHz channels). The filtered outputs are then frequency-shifted upwards by 500 MHz by means of a quadrature mixer comprising first and second doubly balanced mixers 688A and 688B clocked by synchronously generated 500 MHz quadrature clocks 686A and 686B to produce an output signal spanning the frequency range from about 175 MHz to 825 MHz. The quadrature clocks 686A and 686B are produced by a digital divider 686 that divides the 1000 MHz master clock into two 90 degree separated 500 MHz quadrature components, with the 0 degree quadrature clock component 686A applied to the first mixer 688A and 90 degree shifted quadrature clock component 686B applied to the second mixer 688B. These doubly-balanced mixers 688A and 688B can be conventional doubly-balanced passive diode mixers, which are well-suited to this application by virtue of their of their inherent differential interface and wide bandwidth. The conversion loss must be made up with a power amplifier chain, but gain is easy and inexpensive to obtain at these frequencies.

As described above, the 500 MHz quadrature clocks 686A and 686B are derived from the 1000 MHz master clock by dividing by 2. This is a low-phase-noise operation, assuming good quality dividers, so the 500 MHz quadrature signals exhibit low phase noise. Using the rising edge of the 1000 MHz master clock to produce one 500 MHz quadrature clock and the falling edge to produce the other yields two 500 MHz signals in phase quadrature. Inverted versions of both signals are also available from the dividers, yielding differential clock signals to feed to the LO ports of the mixers 688A and 688B.

While the duty cycle of the 1000 MHz signal will not be exactly 50% and the delays of the dividers may not be perfectly matched, they will nonetheless be quite stable. Accordingly, any resultant quadrature error can be compensated digitally in the manner described hereinabove with respect to FIG. 5. An alternative method to generate the quadrature clock signals 686A and 686B is to use a single divider to derive a single 500 MHz clock from the 1000 MHz master clock, then to employ a transmission line delay to produce the required 90 degree phase shift. (Note the convenience of the fixed frequency here.) Sideband suppression of around 40–45 dB is needed to maintain acceptable signal quality for 256-QAM.

Finally, the outputs of the two mixers 688A and 688B are summed in summing block 690 and amplified by a power amplifier to produce a multi-RF output 694.

The sort of modulator described hereinabove with respect to FIG. 6 is most useful when the cable spectrum to which it will be applied is primarily digital, requiring little or no RF combining with "legacy" analog signals. As digital television distribution migrates further towards exclusively digital transmission, this situation is likely to occur with increasing frequency. When the cable spectrum is mostly digital, then an RF combining network can be almost completely eliminated, since the modulator will already have combined all of the requisite signals. At most a few legacy analog channels might have to be combined into the cable spectrum. Accordingly, the insertion losses associated with passive RF combining networks is eliminated, reducing the need for highly linear, high-power amplifiers (PA) in the modulators, a large fraction of the output power of which was formerly wasted in combiner losses. (In an everything-on-demand (EOD) environment, and any environment in which signal distribution is done purely digitally, co-channel isolation requirements at the headend simply disappear.)

If the modulator amplifiers need only be powerful enough to drive laser transmitters (in an HFC environment), this minimizes system cost; indeed typical laser transmitters perform well with total signal powers on the order of −10 dBm, which can be supplied at the requisite linearity by relatively simple low-power feedback amplifiers (and perhaps even directly by some mixers).

Those of ordinary skill in the art will immediately understand that the preferred embodiments shown and described hereinabove represent specific implementations tailored to currently available digital signal processing, D/A converter and/or up-converter technologies, and that adaptations to those embodiments are readily made to accommodate alternative technologies. For example, given sufficient speed, all or a portion of the multi-channel QAM modulator of FIG. 5 could be implemented in software on a digital signal processor or general purpose processor, substituting equivalent computer code for digital logic. Such a system could be specifically designed to execute the functions of the present inventive technique or could be implemented on a commercially available processor. In such a system, the code would be stored as computer instructions in computer readable media. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C or other object-oriented programming language and development tools. Another embodiment of the invention may be implemented in hardwired circuitry in place of, or in combination with, machine-executable software instructions.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A wideband multi-channel direct-to-RF QAM modulator for modulating a plurality of digital data streams onto a single multi-RF output, comprising:
 a high-frequency master clock source operating at a master clock frequency;
 encoding means for encoding each of the digital data streams into a set of QAM encoded-streams;
 processing means for simultaneously converting the plurality of QAM-encoded streams into a single digital multi-channel IF stream encoding the multiple QAM encoded streams onto a set of uniformly spaced carrier frequencies in an intermediate frequency band, said processing means including an inverse FFT (IFFT) and a post-IFFT combined filtering means, said combined filtering means performing a combined equivalent of baseband and anti-imaging filtering;
 digital-to-analog conversion means for converting the single digital multi-channel IF stream into an analog multi-channel IF stream;
 synchronously-clocked quadrature modulation means to frequency-shift the analog multi-channel IF stream upward by one-half of the master clock frequency onto said single multi-RF output; and
 digital quadrature correction means between the combined filtering means and the digital-to-analog conversion means for compensating quadrature error in the synchronously clocked quadrature modulation means.

2. The modulator according to claim 1, wherein:
 at least a portion of the encoding means and IFFT processing means are implemented as a set of parallel-execution sections operating at a binary submultiple of the master clock frequency to produce outputs at the submultiple rate.

3. The modulator according to claim 2, further comprising:
 multiplexing means for switching between outputs of the parallel-execution sections at the master clock rate to produce outputs at the master clock rate.

4. The modulator according to claim 1, wherein:
 the digital data streams are QAM-256 encoded.

5. The modulator according to claim 1, further comprising:
 interpolation means for compensating for a difference between a QAM symbol rate and a channel spacing.

6. A multi-channel direct-to-RF QAM modulator for modulating a plurality of digital data streams onto a multi-RF output, comprising:
 QAM encoding means for encoding the digital data streams into a like plurality of QAM-encoded symbol streams;
 IFFT processing means having each QAM-encoded symbol stream applied to a specific complex frequency input thereof, said IFFT processing means producing a time-domain signal representative of the plurality of QAM-encoded symbol streams modulated onto a set of uniformly spaced carrier frequencies in an intermediate frequency IF band;
 post-IFFT filtering means, producing a filtered time domain signal, for performing the combined equivalent of baseband filtering, anti-imaging filtering and rate interpolation to compensate for a difference between a QAM symbol rate and a channel spacing;
 digital-to-analog conversion means for converting the filtered time-domain signal from complex digital to complex analog form to produce an analog multi-channel IF stream;
 synchronously-clocked quadrature modulation means to frequency-shift the analog multi-channel IF stream upward by one-half of the master clock frequency onto said single multi-RF output; and
 digital quadrature correction means between the post-IFFT filtering means and the digital-to-analog conversion means for compensating quadrature error in the synchronously clocked quadrature modulation means.

7. The modulator according to claim 6, wherein:
 at least a portion of the encoding means and IFFT processing means are implemented as a set of parallel-execution sections operating at a binary submultiple of the master clock frequency to produce outputs at the submultiple rate.

8. The modulator according to claim 7, further comprising:
 multiplexing means for switching between outputs of the parallel-execution sections at the master clock rate to produce outputs at the master clock rate.

9. A method for direct-to-RF multi-channel QAM modulation of a plurality of digital data streams onto a multi-RF output, comprising:
 providing a high-frequency master clock source at a master clock frequency;
 providing a plurality of digital data input streams;
 encoding each of the digital data streams into a set of QAM encoded streams;
 processing the QAM-encoded streams at the master clock frequency to modulate the plurality of QAM-encoded streams into a single complex digital multi-channel IF stream encoding the multiple QAM encoded streams onto a set of uniformly spaced carrier frequencies in an intermediate frequency band, said processing comprising inverse FFT (IFFT) processing and post-IFFT filtering, said filtering comprising a combined baseband and anti-imaging filtering;

converting the digital multi-channel IF stream to analog form;
synchronously frequency-shifting the analog multi-channel IF stream upward by one-half the master-clock frequency onto said multi-RF output; and providing digital quadrature correction between the post-IFFT filtering and the analog converting for compensating quadrature error in the synchronously frequency-shifted analog multi-channel IF stream.

10. A method according to claim 9, further comprising: QAM-256 encoding the digital data streams.

11. The method according to claim 9, further comprising: interpolating the digital multi-channel IF stream to compensate for a difference between a QAM symbol rate and a channel spacing.

12. A wideband multi-channel direct-to-RF QAM modulator for modulating a plurality of digital data streams onto a single multi-RF output, comprising:
a high-frequency master clock source operating at a master clock frequency;
encoding means for encoding each of the digital data streams into a set of QAM encoded-streams;
processing means for simultaneously converting the plurality of QAM-encoded streams into a single digital multi-channel IF stream encoding the multiple QAM encoded streams onto a set of uniformly spaced carrier frequencies in an intermediate frequency band, said processing means including an inverse FFT (IFFT) and a post-IFFT combined filtering means, said combined filtering means performing a combined equivalent of baseband and anti-imaging filtering;
digital-to-analog conversion means for converting the single digital multi-channel IF stream into an analog multi-channel IF stream;
synchronously-clocked quadrature modulation means to frequency-shift the analog multi-channel IF stream upward by one-half of the master clock frequency onto said single multi-RF output; and
digital quadrature correction means for compensating quadrature error to precompensate for subsequent DC offset in the synchronously clocked quadrature modulation means.

13. The modulator according to claim 12 wherein:
at least a portion of the encoding means and IFFT processing means are implemented as a set of parallel-execution sections operating at a binary submultiple of the master clock frequency to produce outputs at the submultiple rate.

14. The modulator according to claim 13, further comprising:
multiplexing means for switching between outputs of the parallel-execution sections at the master clock rate to produce outputs at the master clock rate.

15. The modulator according to claim 12, further comprising:
interpolation means for compensating for a difference between a QAM symbol rate and a channel spacing.

16. A multi-channel direct-to-RF QAM modulator for modulating a plurality of digital data streams onto a multi-RF output, comprising:
QAM encoding means for encoding the digital data streams into a like plurality of QAM- encoded symbol streams;
IFFT processing means having each QAM-encoded symbol stream applied to a specific complex frequency input thereof, said IFFT processing means producing a time-domain signal representative of the plurality of QAM-encoded symbol streams modulated onto a set of uniformly spaced carrier frequencies in an intermediate frequency IF band;
post-IFFT filtering means, producing a filtered time domain signal, for performing the combined equivalent of baseband filtering, anti-imaging filtering and rate interpolation to compensate for a difference between a QAM symbol rate and a channel spacing;
digital-to-analog conversion means for converting the filtered time-domain signal from complex digital to complex analog form to produce an analog multi-channel IF stream;
synchronously-clocked quadrature modulation means to frequency-shift the analog multi-channel IF stream upward by one-half of the master clock frequency onto said single multi-RF output; and
digital quadrature correction means for compensating quadrature error to precompensate for subsequent DC offset in the synchronously clocked quadrature modulation means.

17. The modulator according to claim 16, wherein:
at least a portion of the encoding means and IFFT processing means are implemented as a set of parallel-execution sections operating at a binary submultiple of the master clock frequency to produce outputs at the submultiple rate.

18. The modulator according to claim 17, further comprising:
multiplexing means for switching between outputs of the parallel-execution sections at the master clock rate to produce outputs at the master clock rate.

19. A method for direct-to-RF multi-channel QAM modulation of a plurality of digital data streams onto a multi-RF output, comprising:
providing a high-frequency master clock source at a master clock frequency;
providing a plurality of digital data input streams;
encoding each of the digital data streams into a set of QAM encoded streams;
processing the QAM-encoded streams at the master clock frequency to modulate the plurality of QAM-encoded streams into a single complex digital multi-channel IF stream encoding the multiple QAM encoded streams onto a set of uniformly spaced carrier frequencies in an intermediate frequency band, said processing comprising inverse FFT (IFFT) processing and post-IFFT filtering, said filtering comprising a combined baseband and anti-imaging filtering;
converting the digital multi-channel IF stream to analog form;
synchronously frequency-shifting the analog multi-channel IF stream upward by one-half the master-clock frequency onto said multi-RF output; and
providing digital quadrature correction for compensating quadrature error to precompensate for subsequent DC offset during the synchronously frequency-shifting step.

20. The method according to claim 19, further comprising:
interpolating the digital multi-channel IF stream to compensate for a difference between a QAM symbol rate and a channel spacing.

* * * * *